United States Patent [19]

Saihara et al.

[11] Patent Number: 4,465,539
[45] Date of Patent: Aug. 14, 1984

[54] ARTIFICIAL VENEER AND METHOD OF MANUFACTURING THE SAME

[75] Inventors: Yasuhiro Saihara, Kadoma; Takashi Kishimoto; Kiyouji Masamoto, both of Hirakata; Shozo Hirao, Suita; Takeru Murakami, Yawata; Yoshihiko Yamashita, Okazaki, all of Japan

[73] Assignee: Matsushita Electric Works, Ltd., Osaka, Japan

[21] Appl. No.: 418,747

[22] Filed: Sep. 16, 1982

[51] Int. Cl.$^3$ .................. B32B 3/14; B32B 21/14; B32B 31/18; B27D 1/10
[52] U.S. Cl. ................................. 156/250; 156/254
[58] Field of Search .............. 428/536, 537; 156/250, 156/254

[56] References Cited

U.S. PATENT DOCUMENTS 1,334,637 3/1920 Robinson ........................... 428/535
1,594,889 8/1926 Loetscher .......................... 156/254

FOREIGN PATENT DOCUMENTS 531719 10/1956 Canada ............................. 156/254
0052714 4/1979 Japan .............................. 156/254
0017553 2/1980 Japan .............................. 156/254

Primary Examiner—Marion McCamish
Assistant Examiner—Nancy A. B. Swisher
Attorney, Agent, or Firm—Burns, Doane, Swecker & Mathis

[57] ABSTRACT

A new artificial veneer resembling expensive natural wood veneers can be manufactured by a new method from an inexpensive raw log, wherein a wood-meal containing veneer is first obtained by slicing in quarter-sawn grain direction a primary artificial flitch of many material veneers of the inexpensive raw log stacked and bonded with a wood-meal layer interposed between them, and many of the wood-meal containing veneers are stacked and bonded, with the material veneers alternately interposed as they stand or as further processed, into a secondary curved artificial flitch, which is sliced in flatsawn grain direction into the new artificial veneers presenting a grain pattern similar to that of the expensive wood with minutely raised and recessed uneven surface at simulated porous zones by the wood-meal containing veneers.

7 Claims, 7 Drawing Figures

ARTIFICIAL VENEER AND METHOD OF MANUFACTURING THE SAME

This invention relates generally to artificial veneers and methods of manufacturing the same and, more particularly, to improvements in the artificial veneer and method of manufacturing the same which is highly similar to veneers of such high grade natural ring-porous wood as, specifically, oak timber or the like from any ordinary and inexpensive raw logs.

When a raw log of such natural ring-porous wood as oak timber is sliced in its flatsawn grain direction into veneers, they present a grain pattern in which porous zones having minutely recessed and raised portions and non-porous zones appear alternately in a flame shape, and such veneers can be used optimumly as wall covering materials for room interior decoration. However, such natural wood resource as oak is not sufficient and hard to obtain, and available oak timber is expensive.

On the other hand, there has been well known a basic method of manufacturing artificial veneers by forming an artificial flitch of a large number of stacked material veneers cut out of inexpensive raw tropical logs by means of a veneer manufacturing machine such as a rotary lathe, and slicing this artificial flitch in its flatsawn grain direction into veneers. For example, British Pat. No. 1,391,077 discloses a method wherein a large number of stacked material veneers with a binder or glue applied therebetween are inserted between a pair of pressing dies having pressing surfaces curved to be mutually complemental and are pressed to be collected into a curved artificial flitch, and this artificial flitch is sliced in its flatsawn grain direction into artificial veneers.

According to this method, annual-ring-borders can be presented by joining faces of the respective stacked material veneers which appearing in curved lines but, since the annual-ring-borders are shown only by such joining face lines, the method is entirely insufficient to provide such an artificial veneer having a pattern similar to the grain pattern of, for example, the oak timber veneer in which porous zones presenting minutely recessed surface occupy a considerably large area, and it has been substantially impossible to simulate the grain pattern of such natural wood.

Accordingly, a primary object of the present invention is to provide a method of manufacturing from an inexpensive raw log an artificial veneer presenting patterns much similar to natural wood grain patterns that can be obtained when a high grade natural wood of relatively insufficient natural resource and thus expensive is sliced in their flatsawn grain direction.

Another object of the present invention is to provide an artificial veneer and a method of manufacturing the same which presenting a pattern closely resembling a high grade natural wood grain pattern that appears when oak or the like timber is sliced in its flatsawn grain direction, involving porous zones of minutely uneven surface and expanding relatively largely in the vicinity of annual-ring-borders, the veneer thus being suitable for use optimumly as wall covering materials for room interior decoration.

A further object of the present invention is to provide an artificial veneer and a method of manufacturing the same which can faithfully present both the porous and non-porous zones between annual-ring-borders that are existing in natural wood veneers.

Still another object of the present invention is to provide an artificial veneer and a method of easily manufacturing the same with remarkably improved workability and at a low cost.

Referring here to certain technical terms used in this specification prior to detailed explanation of the present invention, the term "artificial flitch" means an integral stack of many veneers of one or more of such various type veneers as material veneers, wood-meal containing veneers, collected veneers and wood-fragment containing veneers stacked under a pressure with a binder applied between them to be collected into a batch. The term "material veneer" means a veneer cut out of a raw log by such a veneer manufacturing machine as a rotary lathe and to be of a predetermined width. The term "wood-meal containing veneer" means a veneer obtained by first forming an artificial flitch of the material veneers which are stacked and compressed with a layer of powdery wood meal or similar particle substance of plastic or the like material interposed between them as glued, and then slicing this artificial flitch in its quartersawn grain direction. The term "collected veneer" means a veneer obtained by first forming an artificial flitch of the material veneers stacked and compressed with a binder interposed between them and then slicing this artificial flitch in its quartersawn grain direction. The term "wood-fragment containing veneer" means a veneer obtained by slicing in the quartersawn grain direction an artificial flitch of the material veneers stacked and compressed with narrow fragments of wood interposed between them as glued.

Further, the term "quartersawn grain direction" means a direction in which joined surfaces of the stacked veneers of any flitch appear in parallel straight lines when sliced, while the term "flatsawn grain direction" means a direction in which the joined surfaces appear in curved lines of a flame shape.

Further detailed technical idea, other objects and advantages of the present invention shall be made clear in the following description of the invention detailed with reference to preferred embodiments shown in accompanying drawings, in which:

FIG. 1 shows an embodiment of the method of manufacturing artificial veneers in accordance with the present invention, in which

Figures 1A, 1B:
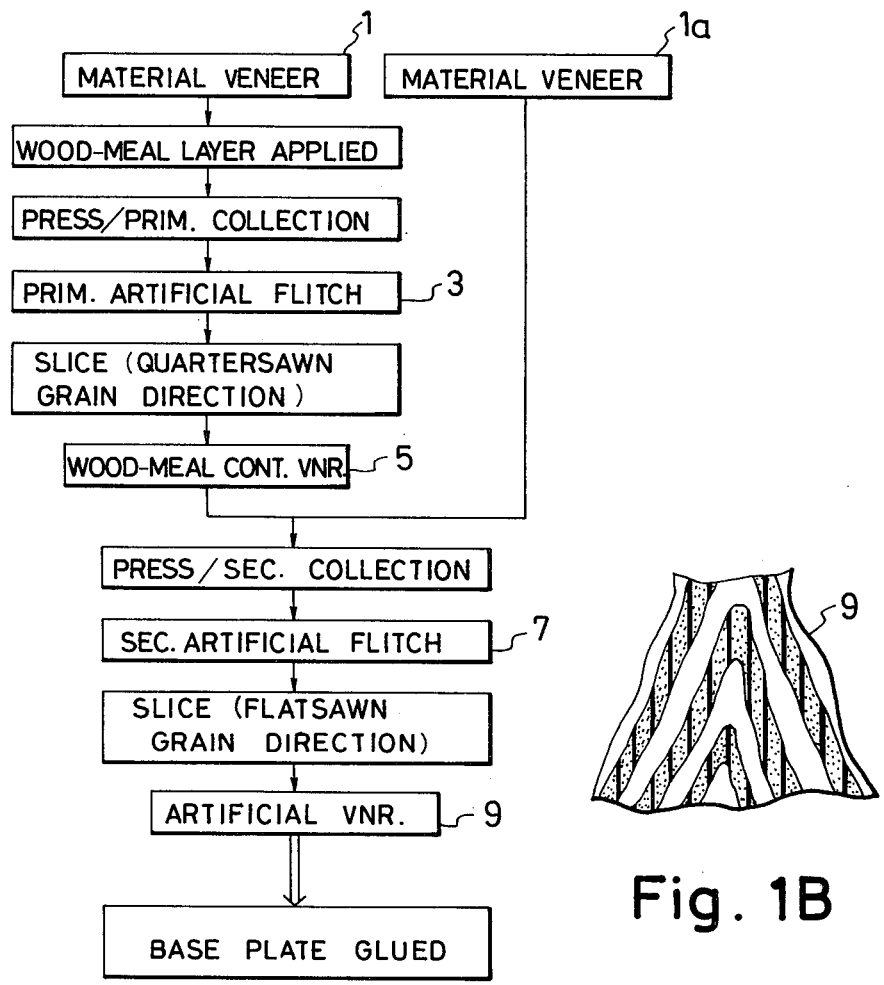
FIG. 1A is a block diagram showing respective steps of the method.
FIG. 1B is a fragmental plan view as somewhat magnified of the artificial veneer eventually obtained at the final step in the method of FIG. 1A.

While the present invention shall now be explained in the followings with reference to the preferred embodiments shown in the drawings, the intention is not to limit the invention only to these embodiments shown but rather to include all other modifications, alterations and equivalent arrangements possible within the scope of appended claims.

According to an aspect of the present invention, an artificial flitch is formed by bonding wood meal or similar particle substance onto a material veneer, stacking a plurality of such material veneers respectively carrying the wood meal, and compressing them together, and an artificial veneer presenting porous zones resembling excellently those of a natural wood can be realized by effectively utilizing a wood-meal containing veneer obtained by slicing the above flitch. Referring here to FIGS. 1 and 2, a material veneer 1 is first prepared, as has been known, by slicing a raw log of natural woods, with the use of such a veneer manufacturing machine as a rotary lathe, into natural wood veneers which are, as required, bleached, dyed into any proper color tone and dried. Next, the material veneer 1 thus obtained is coated on one surface with a binder, and a layer of wood meal 2 is adhered onto the entire surface of the veneer coated with the binder. A plurality of such veneers coated with the wood meal are stacked into a pile, which is inserted between a pair of ordinary pressing dies having flat pressing surfaces (not shown) to be compressed sufficiently to achieve a primary collection of the material veneers and layers of the wood meal, and a resultant primary artificial flitch 3 is sliced with a cutter 4 in its quartersawn grain direction into a plurality of wood-meal containing veneers 5.

Then, a secondary collection is performed in such that these wood-meal containing veneers 5 and, for example, further material veneers 1a which are preferably the same as those used for the wood-meal containing veneer 5 are stacked at a ratio of, for example, 1:1 as alternately disposed, a pile of thus stacked veneers is placed and compressed between a pair of opposing dies 6 having complementarily curved pressing surfaces to be collected together into a secondary artificial flitch 7. In this case, the further material veneers 1a are preferably dyed in a light color, that is, an early wood color, in contrast to the material veneers 1 used for the wood-meal containing veneers 5. The thus obtained artificial flitch 7 is curved, as seen in FIG. 2, in a direction transversing the direction in which the joined surface lines of the wood-meal containing veneers are running, and such flitch 7 is sliced with a cutter 8 in its flatsawn grain direction at an angle θ with respect to a plane including the entire one surface of the wood-meal containing veneer or material veneer, to thereby obtain artificial veneers 9 as final products.

Figure 2:
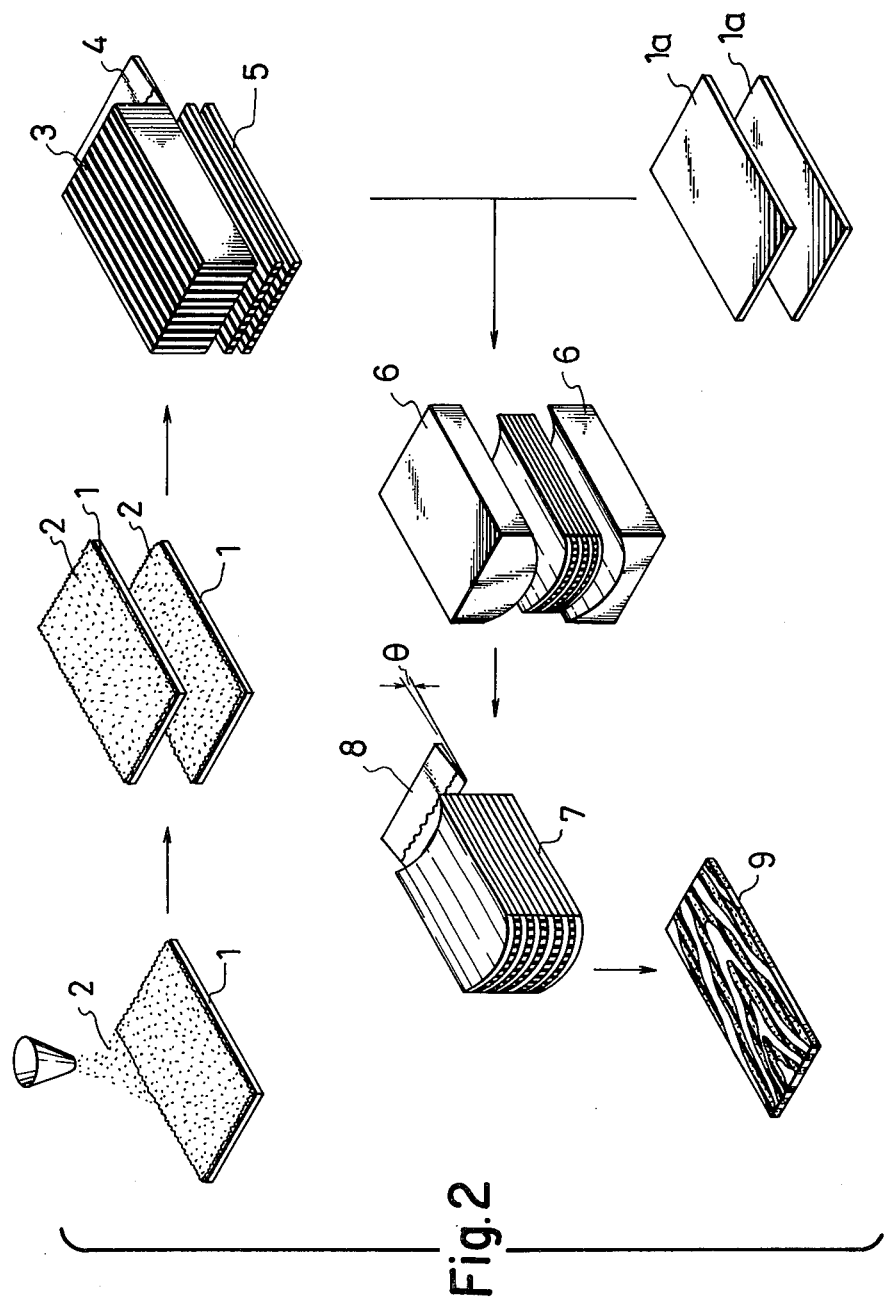
FIG. 2 is an explanatory view showing, in sequential perspective views, more practically major ones of the steps of FIG. 1A which are proceeded in the order shown by arrows.

In the artificial veneer 9 thus obtained by slicing the curved secondary artificial flitch 7 in the flatsawn grain direction, a pattern much similar to the flatsawn grain pattern of a natural wood in such a flame-shaped pattern as shown in FIG. 1B can be presented. In particular, the porous zones of natural wood can be presented as properly simulated by the wood-meal layers in the respective wood-meal containing veneers. While the wood-meal layers are mutually in parallel relation and even the simulated porous zones in the resultant artificial veneer are also presented parallelly when observed microscopically, the spacing between the respective wood-meal layers is considerably small and, in ordinary view, the powdery wood meal scattered all over the respective porous zones will effectively provide the uneven surface of the zone in the natural wood and sufficiently simulate the latter. Therefore, in the artificial veneer 9 shown in FIGS. 1B and 2, the wood meal in the porous zones is somewhat exaggeratedly illustrated as being scattered all over the zone.

Figures 4, 6:
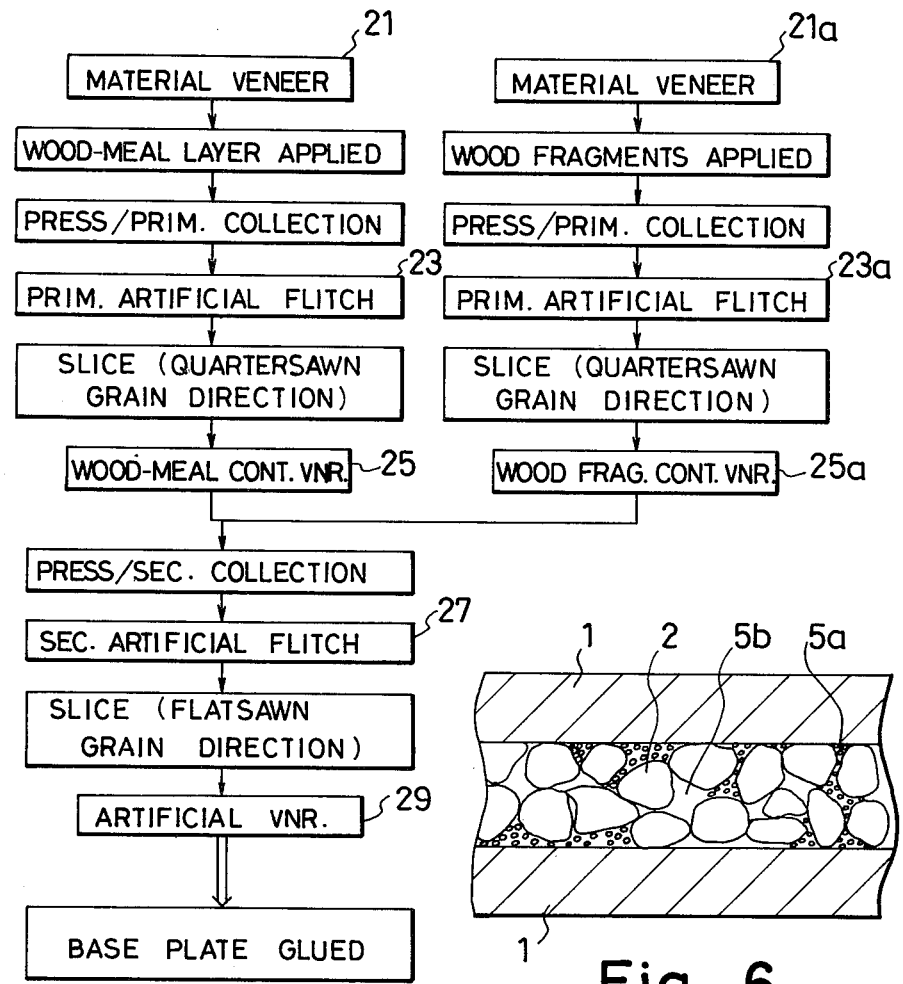
FIG. 4 is a block diagram showing steps in a further embodiment of the method according to the present invention.
FIG. 6 is a fragmentary section as magnified for showing, somewhat schematically, the wood-meal containing veneer manufactured according to the method of the present invention.

For the binder employed in adhering the wood meal 2 onto the material veneer 1 to obtain the wood-meal containing veneers, urethane resin foam adhesive may properly be employed, in which event, as seen in FIG. 6, the foam adhesive 5a enters into gaps between respective particles of the wood meal 2 disposed between the respective material veneers 1 while leaving certain air gaps 5b still open. Accordingly, in the artificial veneer 9 obtained by slicing the secondary artificial flitch 7 emplying the foam adhesive, the open air gaps 5b extensively made in the wood-meal layers will increase a three-dimensional effect of the minutely uneven surface of the simulated porous zones by means of the wood meal.

It is also possible to further enhance the three-dimensional effect of the simulated porous zones by applying a wiping operation onto the artificial veneer 9 in such that, for example, a desired color tone of pigment is first applied to the veneer 9 and is then wiped off so as to leave partially the pigment in the recessed or opened portions in the porous zones and distinctly outline such uneven portions.

In preparing the wood-meal containing veneer 5, further, the wood meal may be replaced, as will be obvious for skilled in the art, by any other particle substance of such material as, preferably, plastics.

An example of conditions for practicing the foregoing embodiment shall be detailed in the following:

TABLE I

1. Material Veneer for Primary Artificial Flitch (for porous zone):
   (a) Raw log: Agathis timber (tropical wood) of 0.6 mm thick.
   (b) Dyeing: For 3 hours in an metallic complex dye solution at a bath temperature of 90° C.
   (c) Adhesive: Urethane resin foam adhesive.
2. Wood-meal: Agathis timber meal of 20–32 mesh.
3. Material Veneer for Secondary Flitch (for non-porous zone):
   (a) Raw log: Agathis timber (tropical wood) of 0.25 mm thick.
   (b) Dyeing: For 3 hours in a metallic complex dye solution at a bath temperature of 90° C.
   (c) Adhesive: Urethane resin adhesive.
4. Primary Artificial Flitch:
   (a) Pressing dies: Flat dies.
   (b) Compressing pressure, time and temperature: 1.5 Kg/cm$^2$ for 2 hours at the room temperature.
   (c) Total number of veneers: 400
5. Slicing of Primary Artificial Flitch:
   Into veneers of 2 mm thick.
6. Secondary Artificial Flitch:
   (a) Pressing dies: Concavo-convex dies of a curvature of 200 mm on the pressing surfaces.
   (b) Compressing pressure, time and temperature: 18 Kg/cm$^2$ for 2 hours at the room temperature.
   (c) Total number of veneers: 600 (300 wood-meal veneers and 300 material veneers).
7. Slicing of Secondary Artificial Flitch:
   Into veneers of 0.25 mm thick, at slicing angle of 1/200 in inclination.

Note: The material veneers, wood-meal containing veneers and artificial veneers were properly dried to have a moisture content of 20 to 70%, as required.

It has been found in connection with the above example that the raw log for the material veneer may be replaced by such inexpensive tropical wood as labra timber, tepa timber, obeche timber or tilia japonica timber, that the adhesive may be an amino resin adhesive, and that the dye may be an acid dye, in order to obtain substantially the same artificial veneer.

Further, while it is preferable to use the same raw log in preparing the material veneers for forming the both porous and non-porous zones, it is also possible to employ different kinds of the raw logs for the material veneers.

Figure 3:
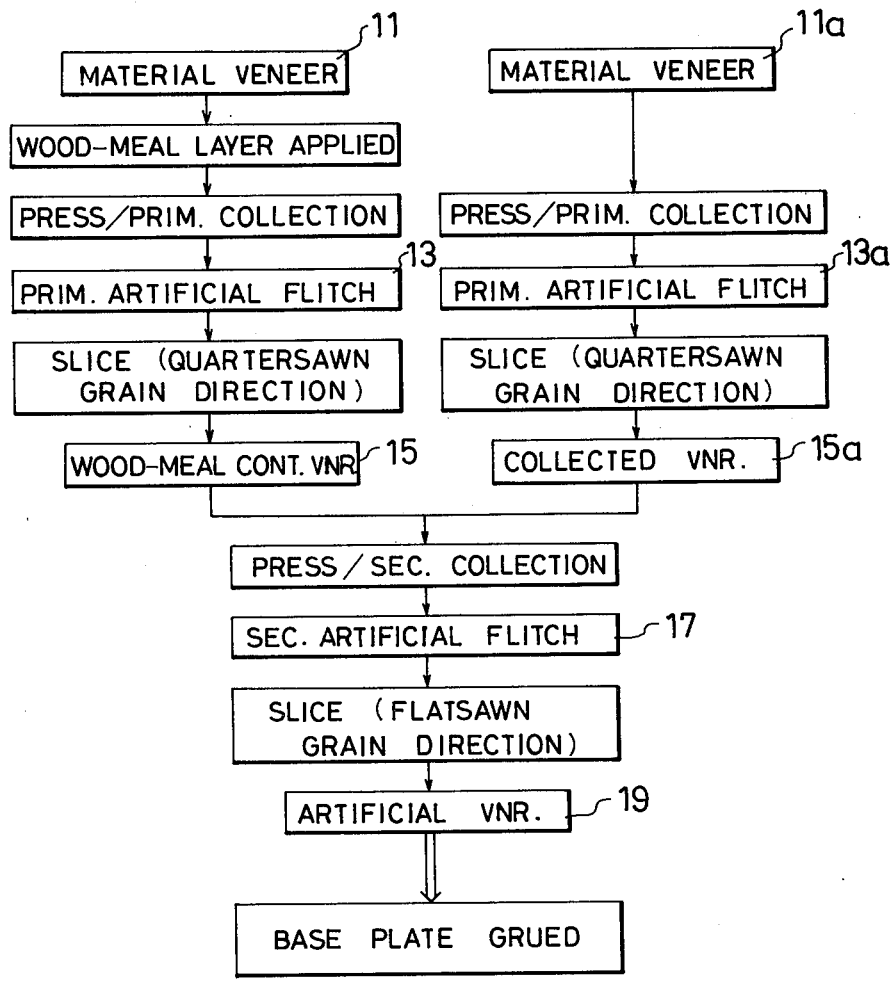
FIG. 3 is a block diagram showing steps in another embodiment of the artificial veneer manufacturing method in accordance with the present invention.

According to another aspect of the present invention, an artificial veneer in which the non-porous zones are presented more faithfully can be obtained by combining a collected veneer obtained by stacking, compressing and slicing the material veneers, with the wood-meal containing veneers used for presenting the porous zones. Referring to FIG. 3, the steps of forming the wood-meal containing veneers 15, from the application of wood meal onto material veneers 11 through the formation of a primary artificial flitch 13, are substantially the same as those in the embodiment shown in FIGS. 1 and 2. In the present embodiment, on the other hand, a plurality of further material veneers 11a are stacked into a pile with an adhesive interposed between them, the pile is compressed between a pair of flat pressing dies to obtain another primary artificial flitch 13a and, by slicing this primary artificial flitch 13a in its quartersawn grain direction, collected veneers 15a are obtained. The foregoing wood-meal containing veneers 15 are combined with the thus obtained collected veneers 15a as stacked alternately with each other at a ratio of, for example, 1:1 with an adhesive applied therebetween, the resultant stack is compressed by means of the complementarily curved dies to achieve the secondary collection of forming a secondary artificial flitch 17, and this flitch 17 is sliced in its flatsawn grain direction into artificial veneers 19. As will be readily appreciated by those skilled in the art, the steps for forming the secondary artificial flitch 17 and artificial veneers 19 in this embodiment are substantially the same as those in the embodiment shown in FIGS. 1 and 2.

According to the present embodiment, many joining surface lines of the material veneers 11a are formed mutually in parallel relation in the collected veneer 15a and, in the resultant artificial veneer 19, the adhesive in such joining surface lines is effective in reinforcing the respective material veneer portions, whereby there arise an effect that the non-porous zones in such natural wood as, for example, oak timber can be more faithfully presented. In practicing the embodiment, the same conditions as listed in Table I, and the artificial veneers 19 showing favorable appearance have been obtained.

Figure 5:
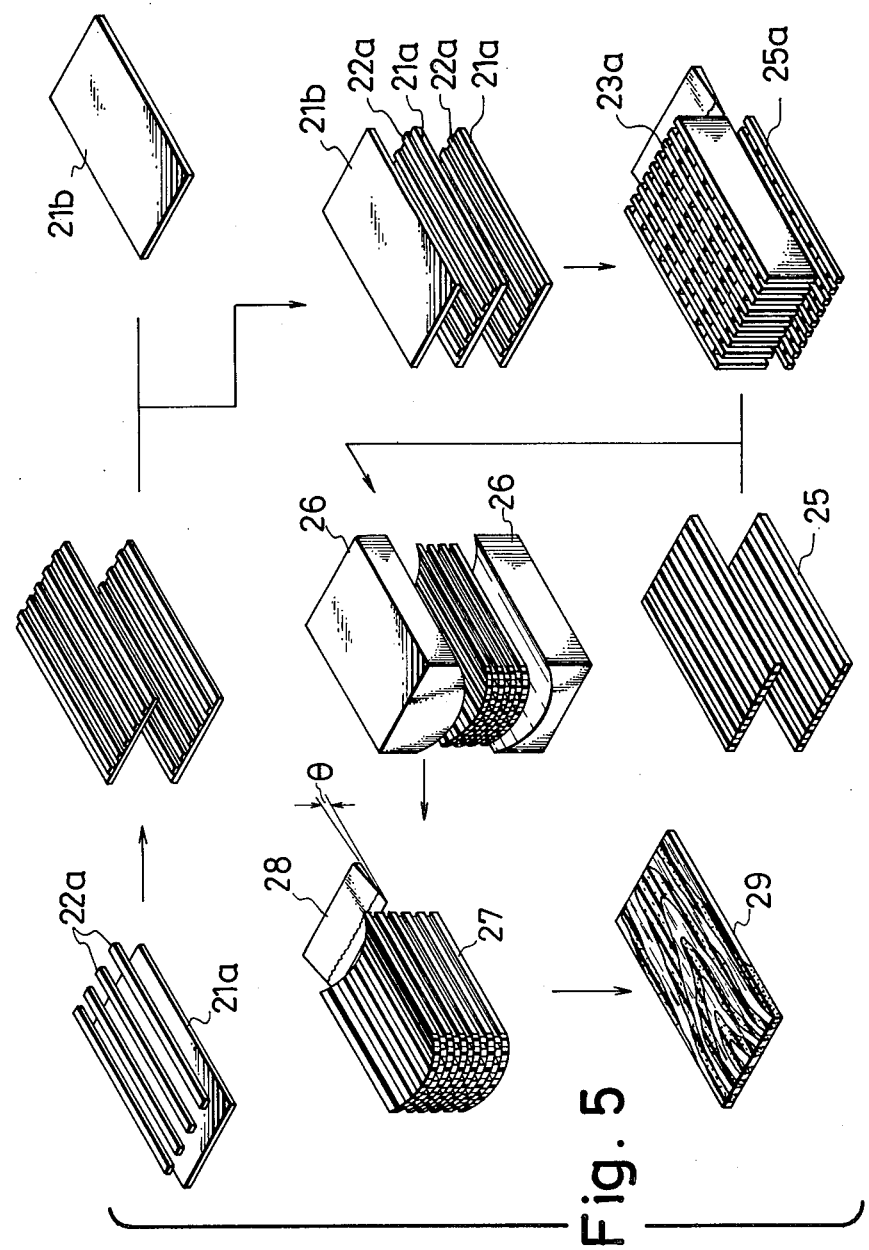
FIG. 5 is an explanatory view showing, in sequential perspective views, more practically major steps in the method of FIG. 4, which are proceeded in the order shown by arrows.

According to still another aspect of the present invention, there can be provided an artificial veneer in which the non-porous zones can be more faithfully presented by means of a combination of wood-fragment containing veneers with the wood-meal containing veneers used for the porous zone representation, the former being prepared by adhering many narrow fragments of wood onto the material veneer, pressing a stack of many of such veneers carrying the fragments with an adhesive interposed to collect them into a flitch and slicing thus obtained flitch into the wood-fragment containing veneers. Referring to FIGS. 4 and 5, the steps for forming the wood-meal containing veneers 25, from the step of applying the wood meal layer onto material veneers 21 through that of slicing a primary artificial flitch 23, are substantially the same as those in the foregoing embodiment. In the present embodiment, on the other hand, a plurality of narrow elongated fragments of wood (or of the material veneers) are adhered to the respective material veneers as disposed thereon to lie in the direction of fibers forming the material veneers (only several fragments are shown in FIG. 5 as much coarsely disposed, for the brevity of the illustration), a plurality of such wood-fragment-carrying material veneers 21a are heaped up into a pile, a piece of plain material veneer 21b is placed on the outermost one of the piled material veneers 21a on its side of the wood fragments, the entire pile is compressed by the flat pressing dies performing a primary collection of the respective veneers, to form another primary artificial flitch 23a, which is then sliced in its quartersawn grain direction into the wood-fragment containing veneers 25a in the respective which the wood fragments disposed between adjacent material veneers form a fine grid pattern.

Further, a plurality of such wood-fragment containing veneers 25a are stacked as combined aternately with the wood-meal containing veneers 25 at a ratio of, for example, 1:1, with an adhesive interposed between them, and the stack is compressed by means of the curved pressing dies to form a secondary artificial flitch 27 which is sliced in its flat-sawn grain direction to obtain artificial veneers 29. In the present instance, the manufacturing steps of the secondary artificial flitch 27 and artificial veneer 29 are substantially the same as those in the embodiment shown in FIGS. 1 and 2.

In the thus obtained artificial veneer 29 according to this embodiment, the wood fragments 22a appearing on the slightly diagonally sliced surfaces of the veneer 29 are present as finely scattered in the non-porous zones with minute spaces between the material veneers and, notwithstanding such spaces, the comparatively solid material veneer portions in the particular zones sufficiently provide the non-porous appearance and, rather, the mutually parallelly disposed fragments are effective in enhancing a three-dimensional feeling of actual radial structure in the non-porous zones in the case of such natural wood as oak timber, so that the non-porous zones can be more faithfully presented. In practicing the present embodiment under the conditions listed in Table I, the fragmental woods adhered to the material veneer were 0.3 mm thick and 0.5 mm wide, an urethane resin adhesive was employed, and a favorable artificial veneer 29 which simulating excellently the natural grain pattern of oak timber could have been obtained. It will be obvious that the foregoing fragments of wood may be replaced with a plastics or paper material.

According to the method of manufacturing artificial veneers of the present invention, as has been described, there can be provided an artificial veneer which simulates faithfully the grain pattern appearing when such natural hardwood as oak timber is sliced in its flatsawn grain direction and can be used most favorably as room interior decoration, and, further, an artificial veneer presenting a pattern highly similar to the grain pattern of a high grade natural wood can be continuously manufactured from inexpensive tropical woods on a mass production basis.

What we claim as our invention is:

1. A method of manufacturing artificial veneers comprising the steps of
   preparing material veneers cut out of at least a raw log,
   depositing wood meal onto respective said material veneers with an adhesive interposed,
   preparing a primary artificial flitch by stacking, pressing and collecting a plurality of said material veneers having said wood meal adhered such that said primary flitch comprises alternating layers of material veneers and wood meal,
   slicing said primary artificial flitch in its quartersawn grain direction by a cutting edge oriented generally perpendicularly to the planes of said layers to obtain particle-containing veneers,
   preparing a secondary artificial flitch by stacking, pressing and collecting with an adhesive interposed a combination of a plurality of said particle-containing veneers with additional ones of said material veneers such that said additional material veneers are disposed in alternating relationship relative to said particle-containing veneers and are oriented generally perpendicularly to the planes of said layers of said particle-containing veneers, said additional material veneers being provided in said secondary flitch at a ratio of at least 1:1 relative to said particle-containing veneers, and
   slicing said secondary artificial flitch in its flatsawn grain direction by a cutting edge oriented generally perpendicularly to the planes of said layers and traveling through said secondary flitch in a direction oriented at an angle relative to the planes of said additional material veneers.

2. A method according to claim 1 wherein said adhesive for depositing said wood meal onto said material veneers is a foam adhesive.

3. A method according to claim 2 wherein said foam adhesive is of an urethane resin.

4. A method according to claim 1 wherein said material veneers employed for preparing said secondary artificial flitch are made of the same raw log as said material veneers to which said wood meal is deposited.

5. A method according to claim 1 wherein said material veneers employed for preparing said secondary artificial flitch are collected veneers obtained by collecting a plurality of said material veneers stacked and pressed with an adhesive interposed into another primary artificial flitch and slicing said another primary artificial flitch.

6. A method according to claim 1 wherein said material veneers employed for preparing said secondary artificial flitch are fragment-containing veneers obtained by depositing a plurality of elongate fragmentary members onto said material veneers, collecting a plurality of said material veneers having said fragmentary members stacked and pressed with a binder interposed into another primary artificial flitch and then slicing said another primary flitch.

7. A method according to claim 6 wherein said fragmentary member is of wood.

* * * * *